(12) United States Patent
Haywood et al.

(10) Patent No.: US 9,308,473 B2
(45) Date of Patent: Apr. 12, 2016

(54) PHASE SPLITTER

(75) Inventors: Ross Jeffrey Haywood, Cashmere (AU);
Scott Brian Poulter, Birkdale (AU)

(73) Assignee: HATCH PTY LTD, Perth (AU)

( * ) Notice: Subject to any disclaimer, the term of this patent is extended or adjusted under 35 U.S.C. 154(b) by 245 days.

(21) Appl. No.: 14/111,852

(22) PCT Filed: Apr. 11, 2012

(86) PCT No.: PCT/AU2012/000364
§ 371 (c)(1),
(2), (4) Date: Dec. 17, 2013

(87) PCT Pub. No.: WO2012/142650
PCT Pub. Date: Oct. 26, 2012

(65) Prior Publication Data
US 2014/0110359 A1 Apr. 24, 2014

(30) Foreign Application Priority Data

Apr. 20, 2011 (AU) .................................. 2011901489

(51) Int. Cl.
*B01D 17/025* (2006.01)
*B01D 17/02* (2006.01)
*B01D 11/04* (2006.01)
*C22B 3/26* (2006.01)
*C22B 3/02* (2006.01)

(52) U.S. Cl.
CPC ............ *B01D 17/02* (2013.01); *B01D 11/0453* (2013.01); *B01D 17/0214* (2013.01); *C22B 3/0005* (2013.01); *C22B 3/02* (2013.01); *Y02P 10/234* (2015.11)

(58) Field of Classification Search
CPC ............... B01D 17/02; B01D 17/0208; B01D 17/0214; C02F 1/40
USPC ................. 210/776, 800, 521, 525, 540, 541; 137/561 A
See application file for complete search history.

(56) References Cited

U.S. PATENT DOCUMENTS

| | | | | |
|---|---|---|---|---|
| 2,782,929 | A * | 2/1957 | Colket | 210/540 |
| 3,529,728 | A * | 9/1970 | Middelbeek et al. | 210/540 |
| 4,111,805 | A * | 9/1978 | Van Pool et al. | 210/540 |
| 5,378,376 | A * | 1/1995 | Zenner | 210/776 |
| 5,679,265 | A * | 10/1997 | Van Schie | 210/776 |
| 7,328,809 | B2 * | 2/2008 | Gigas et al. | 210/521 |
| 2010/0270244 | A1 | 10/2010 | Chao | |

OTHER PUBLICATIONS

Munir, S. et al., "Development of an Inclined Plate Extractor-Separator for Immiscible Liquids," Energies 2009, 2, ISSN 1997-1073, pp. 957 to 975.
Written Opinion for PCT/AU2012/000364, mailed Aug. 8, 2012, ISA/AU.

* cited by examiner

*Primary Examiner* — Christopher Upton

(57) ABSTRACT

A phase splitter (14) for splitting phases of liquids, the phase splitter (14) characterized by an elongate body (16) having a generally convexly curved liquid-facing face (28) when viewed in transverse cross-section along a longitudinal axis of the elongate body (16).

18 Claims, 2 Drawing Sheets

PHASE SPLITTER

CROSS-REFERENCE TO RELATED APPLICATIONS

This application is a 371 U.S. National Stage of International Application No. PCT/AU2012/000364, filed on Apr. 11, 2012, and claims priority to Australian Patent Application No. 2011901489, filed on Apr. 20, 2011, the disclosures of which are herein incorporated by reference in their entirety.

TECHNICAL FIELD

This invention relates to solvent extraction and partitioning. More particularly, the invention relates to a splitter for splitting liquid phases, to a splitter assembly for splitting liquid phases, and to a method of splitting liquid phases.

BACKGROUND ART

The following discussion of the background art is intended to facilitate an understanding of the present invention only. The discussion is not an acknowledgment or admission that any of the material referred to herein is or was part of the common general knowledge as at the priority date of the application.

Liquid-liquid extraction, also referred to as solvent extraction or partitioning, is a method used in hydrometallurgy to separate or extract compounds from one liquid phase into another liquid phase. This is accomplished by manipulating the relative solubilities of the compounds to be isolated in two or more liquids having differing characteristics, as is the case with an aqueous phase (such as water), and an organic solvent phase (such as an oil or immiscible organic solvent).

The term solvent extraction can also refer to the separation of a substance from a mixture by preferentially dissolving that substance in a suitable solvent. In such a case, a soluble compound may be separated from an insoluble compound or a complex matrix.

Although the term partitioning is sometimes used to refer to the underlying chemical and physical processes involved in liquid-liquid extraction, these terms as used herein should be considered synonymous.

In the field of solvent extraction or partitioning, several hydrometallurgical systems are known which incorporate systems for manipulating liquid flow streams and phases, and for separating, splitting, or isolating liquids or phases of liquids, and the desired compounds extracted by such systems. Typically, a mixture of an extractant in a diluent is used to extract a desired compound from one phase to another. In solvent extraction techniques this mixture is often referred to as the "organic" phase and entrained organics need to be removed or recovered from the eventual aqueous streams.

Many extraction processes make use of so-called mixer-settlers. Mixer-settlers are a type of mineral process equipment used in solvent extraction processes and consist of a first stage that mixes the phases together in an agitated tank (referred to as a mixer) followed by a quiescent settling stage, usually in the form of a gravity settling basin (settler) that allows the phases to separate by gravity. It is difficult to manage the flow of liquid in settlers to achieve sufficient separation and to also minimise the settler area. The flow of liquids needs to be as laminar as possible, as flow interruptions or turbulence can lead to co-mixing of phases and resultant losses in extraction efficiency. The settling stage allows the phases to separate, but achieving high flow velocities can disturb the flow and hamper the process of separation, making it inefficient. Typical settler stages utilise an organic launder at the downstream end of the settler. The organic launder has a vertical liquid-facing face whereby the organic phase passes over the top lip of the vertical liquid-facing face and the aqueous phase passes under the bottom edge of the vertical liquid-facing face of the organic launder.

It is one object of the present invention to provide a phase splitter, phase splitter assembly, and method which overcomes substantially one or more of the abovementioned problems associated with the prior art, or at least provides a useful alternative thereto.

SUMMARY OF INVENTION

In accordance with the present invention there is provided a phase splitter for splitting phases of liquids, the phase splitter characterised by an elongate body having a generally convexly curved liquid-facing face when viewed in transverse cross-section along a longitudinal axis of the elongate body.

Preferably, the convex liquid-facing face has a generally curved profile when viewed in transverse section and which curves away from the liquid interface, in the direction of liquid flow.

The curve of the liquid-facing face preferably defines an apex which, in use, may be positioned at the interface between an organic phase and an aqueous phase of a liquid stream to be split.

Advantageously, the profile of the liquid-facing face prevents the formation of recirculating flow patterns in each of the phases when applied to a settler. It is understood that this arrangement reduces liquid velocities, reducing entrainment and the settler area that may be required when compared to conventional liquid splitters. The resulting reduction in entrainment allows for the settler to be operated at higher specific flow velocities, leading to higher throughput and yield of desired values.

In one embodiment, the elongate body may, when viewed in cross-section, define a dome or plane curve of constant radius, when plotted from a centre point of a longitudinal axis extending medially along the length of the splitter body.

In another embodiment, the curvature may comprise a plane curve of decreasing radius, when plotted from a centre point of a longitudinal axis extending medially along the length of the splitter body.

In one embodiment, the body of the splitter may comprise a so-called bull-nose profile. The bull-nose profile of the body of the splitter is intended to allow sufficient space behind the liquid-facing face to incorporate a crud decant system should such be required.

A top lip of the splitter body may define a further arc which curves back upon the body of the splitter, thereby defining an overhang or skirt at the operative rear of the splitter. This serves to smooth the flow of liquid in the system.

A bottom lip of the splitter body preferably defines a further arc that curves rearwardly to provide a bottom surface of the splitter body. The bottom lip and bottom surface are arranged so as to allow the aqueous phase to pass therebelow at a sufficient velocity.

It is to be understood that the curvature may be varied so as to allow for the use of the splitter in various liquids having varying characteristics. This may be consequential upon the flow requirements in the organic launder, the organic operating depth, and the aqueous operating depth. It is envisaged that the curvatures of both the liquid facing face of the splitter and the top lip may be varied.

The splitter may be provided as part of an organic launder splitter assembly. Accordingly, in accordance with the present invention there is further provided an organic launder splitter assembly, the assembly characterised by a phase splitter as described hereinabove attached to, or present in, an organic launder.

The phase splitter is preferably attached to the organic launder by way of an attachment means. The attachment means may be provided in the form of one or more arms which are attached or attachable to the liquid splitter. Preferably, the or each arm is attached at a corresponding longitudinal end of the splitter body, or at the top, bottom, or both, of the splitter body.

Alternatively, or additionally, the or each arm is attached or attachable centrally to the body of the splitter, or anywhere along the length of the splitter body.

Typically, the splitter or splitter assembly is provided internally to an organic launder or is located in a settler area in a mineral processing plant.

Preferably, the organic launder is arranged to transmit separated organic out of the settler.

In accordance with the present invention there is still further provided a method of splitting a liquid, or phases of a liquid, the method characterised by the steps of:

bringing a liquid splitter or liquid splitter arrangement of the invention into contact with a liquid stream, and entraining the respective liquids which have been split by the liquid splitter or liquid splitter arrangement.

Preferably, flow velocity of the liquid stream is between about 0.001 m/s and 0.05 m/s. Still preferably, flow velocity of the liquid stream is between about 0.001 m/s and 0.03 m/s. It is to be understood however that flow velocities may be dictated by the properties of the liquids/phases to be separated and the desired throughput rate.

Examples of liquids/phases which may be separated using the splitter of the invention include: an organic phase being a combination of narrow cut kerosene (diluent)(for example Shellsol 2052™) and a dissolved extractant (for example Cyanex 272™); aqueous including water, salts and dissolved metals (for example Cobalt sulphate). Further examples include loaded organic and raffinate, and barren organic and barren strip liquor combinations.

The splitter, system, and method of the present invention are considered to be especially useful in solvent extraction processes for the extraction of non-ferrous values such as copper, uranium, nickel, cobalt, zinc, rare earths and vanadium.

Further aspects of the invention will now be described with reference to the following non-limiting examples and drawings.

Throughout the specification and claims, unless the context requires otherwise, the word "comprise" or variations such as "comprises" or "comprising", will be understood to imply the inclusion of a stated integer or group of integers but not the exclusion of any other integer or group of integers.

As used herein, the term "liquid" means a liquid or a phase or phases of a liquid.

As used herein, the term "splitter" means any device or liquid flow arrangement which allows for the partial or substantial division, isolation, separation, or splitting-out of liquid flow streams or phases of liquids from one another into differential streams or phases which may have characteristics or properties different to each other and/or from the original feed stream or phase.

BRIEF DESCRIPTION OF THE DRAWINGS

The present invention will now be described, by way of example only, with reference to one embodiment thereof and the accompanying drawings, in which.

DESCRIPTION OF EMBODIMENTS

Figure 1:
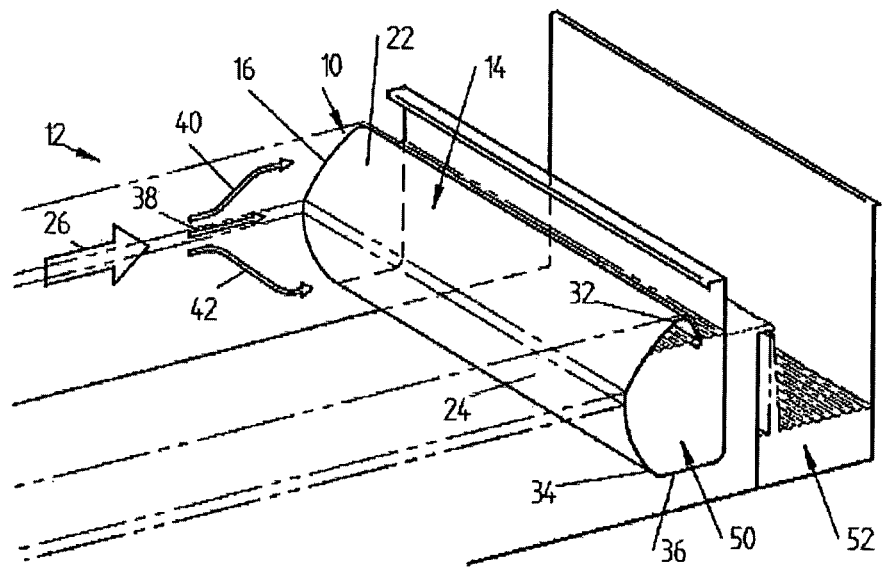
FIG. 1 is an upper perspective part sectional view of a liquid phase splitter in accordance with one aspect of the present invention.

In the drawings, reference numeral 10 refers generally to a splitter arrangement in accordance with one aspect of the invention, the splitter arrangement 10 being located in a settler area 12, whilst reference numeral 14 refers generally to a phase splitter in accordance with the present invention.

Liquid/Liquid Splitter and Splitter Arrangement

Figure 2:
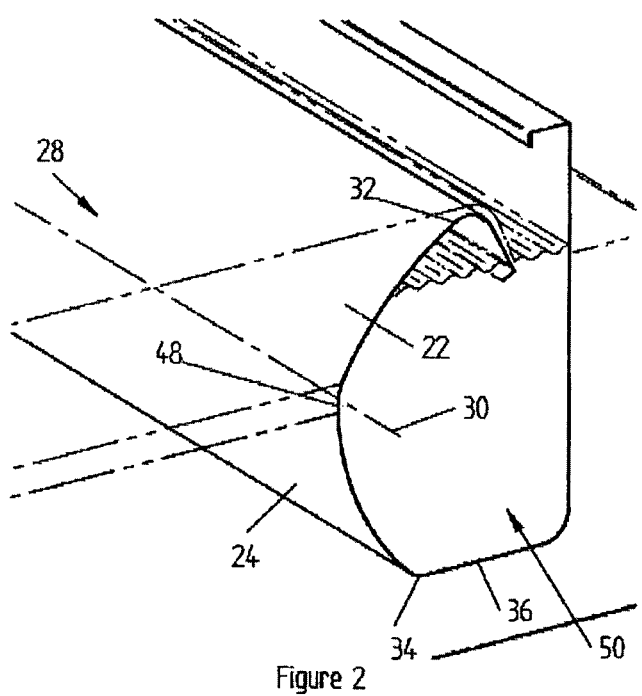
FIG. 2 is an upper perspective view of the liquid phase splitter of FIG. 1, showing the splitter body in detail.
Figure 3:
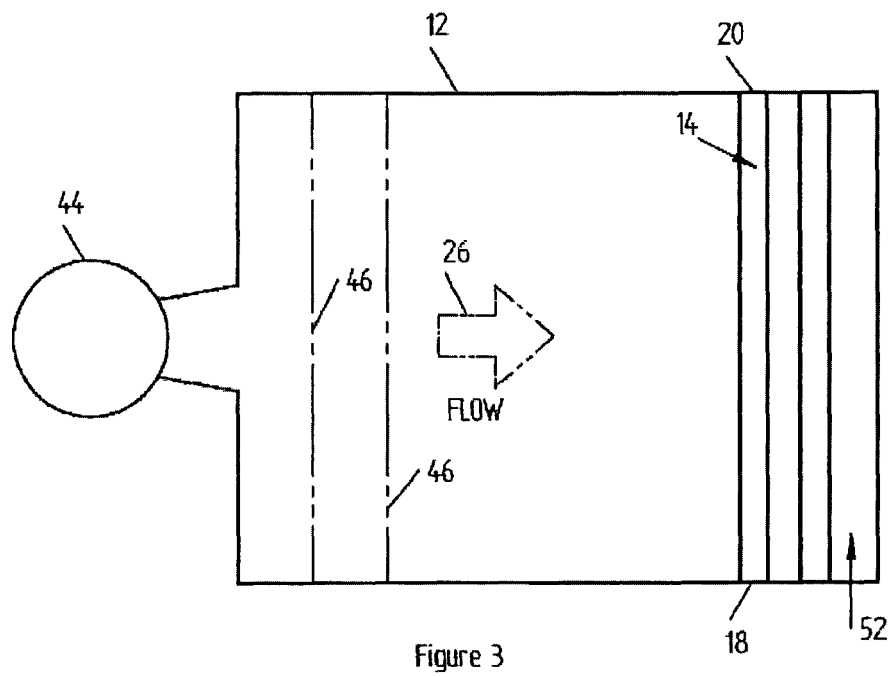
FIG. 3 is an upper plan view of the liquid phase splitter of FIG. 1, shown in use in a settling area.

In FIGS. 1 to 3 there is shown a splitter arrangement 10 comprising a splitter 14 having a generally convex splitter body 16 which is located in a settler area 12. There are a number of means whereby the splitter 14 may be located or arranged in the settler area 12. For example, such may be achieved through one or more attachment means (not shown). The attachment means may include arms which are attached to respective ends 18 and 20 of the splitter body 16, or other attachment means which are attached to the operative upper or lower surfaces of the body 16, to be described hereinafter (indicated generally by reference numerals 22 and 24, respectively). The attachment means serve to maintain the splitter body 16 in position at a desired height in a liquid stream 26, discussed below.

The splitter body 16 has a liquid-facing convex face 28, which is generally of a so-called bullnose design or profile, as is best seen in FIGS. 1 and 2. In the embodiment shown, the splitter body 16 curves at a continuous radius both Upwardly and downwardly away from a longitudinal axis 30, best seen in FIG. 2, and which is defined along the centre of the convex face 28. At an upper end thereof, the body 16 is further curved upon itself so as to define an inverted U-profile, which terminates in a top lip 32. At a bottom end thereof the body 16 is curved back on itself at a bottom lip 34 and from which a lower surface 36 extends rearwardly.

The inventors have experimented with several configurations of splitter faces and shapes, and have found that the configuration of the present invention can split phases of liquids from each other at relatively high flow speeds and provides useful build-up of an intermediate phase or interface 38 (see below) between an upper organic/solvent phase 40 and a lower aqueous phase 42, without unnecessary dispersion. The intermediate phase 38 can then be extracted separately from the remaining phases 40 and 42, should this be required.

Figure 4:
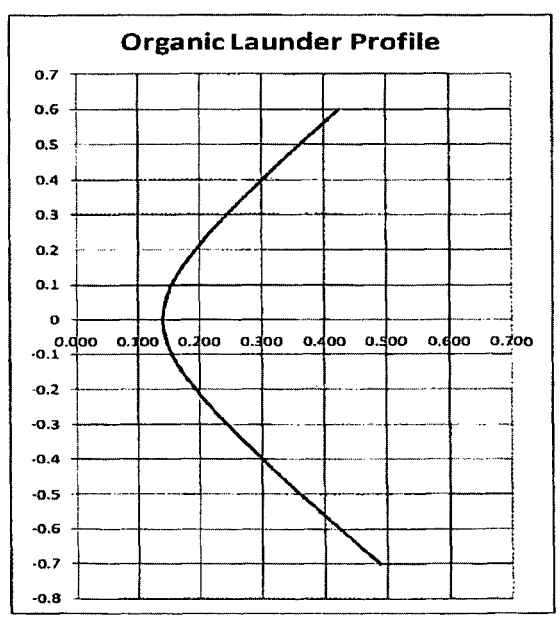
FIG. 4 is a diagrammatic representation of a sectional side view of the liquid facing face of the liquid phase splitter (organic launder) of FIG. 1, shown with dimensions indicating the curvature, and dimensions relative to the settler area.

In FIG. 4 there is shown the curvature of the splitter face as defined by the following general equation:

$$X = c \cdot (a^2 + Y^2/b^2)^{1/2}$$

where a, b and c are chosen for the specific system, and Y, the vertical plane, is the organic and aqueous depth, and X, the horizontal plane, describes the profile of the curvature. Specifically, the example shown in FIG. 4 describes an organic depth of 0.6 m and an aqueous depth of 0.7 m. The factors a, b and c being selected as 0.7, 0.3 and 0.2, respectively. Variable a is adjusted based on the organic plus aqueous depth (the deeper the solution in the settler the larger this figure). Variables b and c are adjusted based on the width of the launder (to be described hereinbelow). This width is dependent in turn on the flow rate of organic processed through the system.

Splitter Operation

As mentioned hereinbefore, a liquid stream 26 emanating from an upstream mixer or processing area, by way of a feed tank 44 and flow distributing devices or baffles 46, shown in FIG. 3, will generally comprise a lower aqueous phase 42, a solvent-based upper phase 40 and, depending on the liquid characteristics and flow kinetics, an intermediate phase 38. In operation, that is when the splitter 14 is in a liquid stream 26 in a settler area, the splitter body 16 is positioned such that the longitudinal axis 30 defining a furthest upstream protrusion 48 aligns generally with the phase interface 38 of the liquid stream 26 to be split. In other words, the splitter body 16 is placed in the settler area 12 at a depth such that the upper solvent/organic phase 40 passes over the upper surface of the body 16, over the top lip 32 and passes into an organic launder 50. The lower aqueous phase 42 passes underneath the splitter body 16, past the bottom lip 34 and the lower surface 36 and into an aqueous launder 52. In certain embodiments, the aqueous may be channelled via an alternative flow path out of the settler area 12.

The splitter 14 of the present invention assists in maintaining relatively high flow velocities. Typically rates of between about 0.001 m/s and 0.03 m/s can be utilised in solvent extraction applications. However, in stripping applications rates of as high as about 0.05 m/s can be utilised. Referring again to application in solvent extraction, generally, flow velocities of up to 0.03 m/s would make the formation of an intermediate layer impossible to see or isolate, but using the splitter 14 of the present invention, this is achievable at these flow velocities. The splitter body 16 is placed in the liquids 26 at a height such that it is aligned with the interface between the organic and aqueous phases. Following splitting, the organic, and aqueous phases and their various contents can be subjected to further treatment or scrubbing.

The Applicant is of the opinion that, advantageously, the profile of the liquid-facing face prevents the formation of recirculating flow patterns in each of the phases when applied to a settler, thereby reducing re-circulating liquid velocities, reducing entrainment and the settler area that may be required when compared to conventional liquid splitters, and reducing dispersion of the intermediate liquid phase at high flow velocities. The resulting reduction in entrainment allows for the settler to be operated at higher specific flow velocities, leading to higher throughput and yield of desired values. Similar improvements relative to the prior art are envisaged when the present invention is applied to stripping applications.

Modifications and variations such as would be apparent to the skilled addressee are considered to fall within the scope of the present invention.

The invention claimed is:

1. A phase splitter for splitting phases of a liquid stream, the phase splitter comprising a splitter body having a generally convexly curved liquid-facing face when viewed in transverse cross-section along a longitudinal axis of the splitter body, the convexly curved liquid-facing face being completely submersed in the liquid stream and having an apex that is a furthest upstream protrusion of the splitter body, and the apex being positioned such that the liquid stream is normal to the apex where the liquid stream makes contact with the furthest upstream protrusion of the splitter body.

2. The phase splitter according to claim 1, wherein the convex liquid-facing face has a generally curved profile when viewed in transverse section and which curves away from the apex in a flow direction of the liquid stream.

3. The phase splitter according to claim 1, wherein the apex is positioned at an interface between an organic phase and an aqueous phase of the liquid stream to be split when the phase splitter is in use.

4. The phase splitter according to claim 1, wherein the convexly curved liquid-facing face has a continuously curved profile that prevents the formation of recirculating flow patterns in the liquid stream in order to prevent mixing of an organic phase and an aqueous phase of the liquid stream.

5. The phase splitter according to claim 1, wherein the elongate body, when viewed in cross-section, defines a dome or plane curve of constant radius, when plotted from a center point of the longitudinal axis extending medially along the length of the splitter body.

6. The phase splitter according to claim 1, the curvature comprises a plane curve of decreasing radius, when plotted from a center point of the longitudinal axis extending medially along the length of the splitter body.

7. The phase splitter according to claim 1, wherein the convexly curved liquid-facing face of the splitter body has a profile that curves at a continuous radius both upwardly and downwardly away from the longitudinal axis, the longitudinal axis being defined along a center of the convexly curved liquid-facing face.

8. The phase splitter according to claim 7, wherein the profile of the splitter body allows sufficient space behind the convexly curved liquid-facing face to incorporate an organic launder.

9. The phase splitter according to claim 1, wherein a top lip of the splitter body defines an arc that curves back upon the splitter body thereby defining an overhang at a rear of the phase splitter.

10. The phase splitter according to claim 1, wherein a bottom lip of the splitter body defines an arc that curves rearwardly to provide a bottom surface of the splitter body.

11. The phase splitter according to claim 10, wherein the bottom surface of the splitter body is parallel to a flow direction of the liquid stream so as to allow an aqueous phase of the liquid stream to pass below the splitter body at a sufficient velocity.

12. An organic launder splitter assembly, the assembly comprising the phase splitter as described in claim 1 and an organic launder.

13. The organic launder splitter assembly according to claim 12, wherein the phase splitter is attached to the organic launder by way of an attachment means.

14. The organic launder splitter assembly according to claim 12, wherein the splitter body fluidly isolates the organic launder from an aqueous phase of the liquid stream traveling through a settler so as to transmit separated organic out of the settler.

15. A method of splitting a liquid, or phases of a liquid, the method comprising the steps of:
   bringing a phase splitter according to claim 1 into contact with a liquid stream, and entraining the respective liquids which have been split by the phase splitter.

16. The method according to claim 15, wherein the flow velocity of the liquid stream is between about 0.001 m/s and 0.05 m/s.

17. The method according to claim 15, wherein the flow velocity of the liquid stream is between about 0.001 m/s and 0.03 m/s.

18. The method according to claim 15, wherein velocities are dictated by the properties of the liquids/phases to be separated and the desired throughput rate.

* * * * *